Thomas L. Rivers
Corner Friction Rollers for Trunks.

No. 120,670.   Patented Nov. 7, 1871.

Witnesses.
W. Burris
H. L. Perrine.

Inventor.
Thomas L. Rivers
By Attorney
G. B. Towles

UNITED STATES PATENT OFFICE.

THOMAS L. RIVERS, OF NEWARK, NEW JERSEY.

IMPROVEMENT IN CASTERS FOR TRUNKS.

Specification forming part of Letters Patent No. 120,670, dated November 7, 1871.

*To all whom it may concern:*

Be it known that I, THOMAS L. RIVERS, of the city of Newark, in the county of Essex and State of New Jersey, have invented a new and Improved Caster for Trunks and similar purposes; and I do hereby declare that the following is a full, clear, and exact description of the construction and operation of the same, reference being had to the accompanying drawing making a part of this specification, in which—

Figure 1:
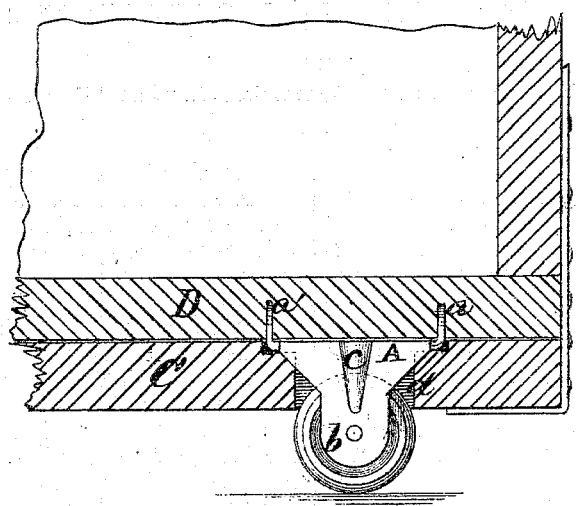
Figure 2:
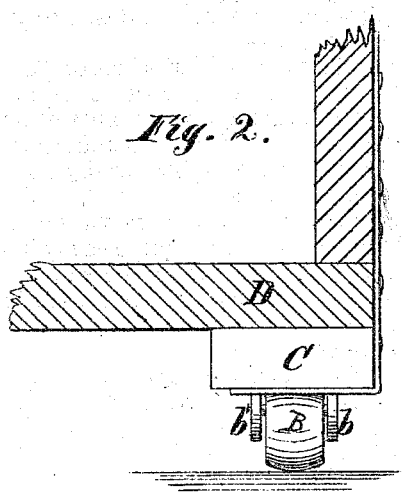
Figure 3:
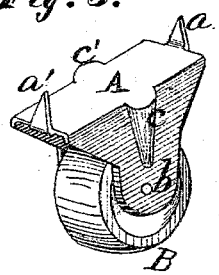

Figure 1 represents a longitudinal section of the trunk and cleat with caster attached. Fig. 2 is an end view of the trunk, cleat and caster. Fig. 3 is a detached perspective view of the caster.

Like letters in the different figures of the drawing indicate like parts.

My invention relates to a new and improved caster for trunks and similar purposes; and consists in providing the sheet-metal frame of the caster with corrugated ears or sides for strengthening them, and with points on the ends to be driven in the bottom of the trunk, in combination with the cleat, so as to hold the casters without nails or screws, thus effecting a saving in cost of labor and material.

A is the frame of sheet-metal which is prepared and cut to form the points $a'$ $a$ and sides or ears $b'$ $b$, the latter being corrugated in the metal forming the conical projections $c'$ $c$, so as to strengthen them; the sides or ears $b'$ $b$ are then bent down and the points $a'$ $a$ turned up, forming the sheet-metal roller-frame, as represented in Fig. 3. B is the roller attached to the sides or ears $b'$ $b$ by a pivot-pin as ordinarily. C is the cleat provided with a hole, $d$, near the end through which is passed the roller B, the frame being let in flush with the upper side of the cleat to allow the latter to come square against the bottom of the trunk D when placed thereon and the points $a'$ $a$ driven in, this being done by hammering on the cleat in the vicinity of the roller, the cleat being fastened in the usual manner, thus holding the roller by the interposition of its frame between the cleat and the bottom of the trunk without nails or screws, except what may be required to fasten the cleat.

Having thus fully described my invention, what I claim therein as new, and desire to secure by Letters Patent, is—

The sheet-metal friction-roller frame A, corrugated in the sides or ears so as to strengthen them, and provided with points $a'$ $a$ in combination with the cleat C for fastening it to the bottom of the trunk, substantially as and for the purposes set forth.

As evidence that I claim the foregoing as my invention, I have hereunto set my hand and seal in the presence of two witnesses.

THOMAS L. RIVERS. [L. S.]

Witnesses:
   SAM. F. BIGELOW,
   JOHN C. DWINING.

(162)